(12) United States Patent
Kanczuzewski et al.

(10) Patent No.: US 6,533,513 B2
(45) Date of Patent: Mar. 18, 2003

(54) CARGO RESTRAINT DEVICE

(75) Inventors: Thomas E. Kanczuzewski, South Bend, IN (US); Gary Zachrich, Mishawaka, IN (US); John Townsend, Ostego, MI (US)

(73) Assignee: Logistick, Inc., South Bend, IN (US)

( * ) Notice: Subject to any disclaimer, the term of this patent is extended or adjusted under 35 U.S.C. 154(b) by 0 days.

(21) Appl. No.: 09/863,172

(22) Filed: May 23, 2001

(65) Prior Publication Data

US 2002/0176759 A1 Nov. 28, 2002

Related U.S. Application Data

(63) Continuation-in-part of application No. 29/141,186, filed on May 1, 2001, now abandoned.

(51) Int. Cl.[7] ................................................ B60P 7/15
(52) U.S. Cl. .................................... 410/152; 410/143
(58) Field of Search ........................... 410/143, 144, 410/152, 121, 150, 151; 248/200.1, 205.3, 264

(56) References Cited

U.S. PATENT DOCUMENTS

| | | | | |
|---|---|---|---|---|
| 2,124,082 A | * | 7/1938 | Reifer | 410/152 |
| 2,467,681 A | * | 4/1949 | McKinney | 410/152 |
| 2,468,101 A | | 4/1949 | Nampa | |
| 3,836,174 A | | 9/1974 | Holman, Jr. | |
| 4,026,508 A | | 5/1977 | Ziegler | |
| 4,616,757 A | | 10/1986 | Hobson | |
| 4,932,817 A | | 6/1990 | Mattare | 410/152 |
| 5,028,184 A | * | 7/1991 | Krause | 410/143 |
| 5,219,251 A | | 6/1993 | Kanczuzewski | 410/127 |
| 5,259,712 A | * | 11/1993 | Wayne | 410/152 |
| 5,320,464 A | * | 6/1994 | Long et al. | 410/144 |
| 5,326,204 A | | 7/1994 | Carlson et al. | 410/143 |
| 5,362,184 A | * | 11/1994 | Hull et al. | 410/90 |
| 5,370,482 A | | 12/1994 | Long | 410/153 |
| 5,494,389 A | | 2/1996 | Kanczuzewski | 410/144 |
| 5,807,047 A | * | 9/1998 | Cox | 410/152 |
| 6,086,299 A | | 7/2000 | Kanczuzewski | 410/152 |

OTHER PUBLICATIONS

Logistick Disposable Cargo Strap Advertisement; 1 page; no date.

* cited by examiner

*Primary Examiner*—Stephen T. Gordon
(74) *Attorney, Agent, or Firm*—Barnes & Thornburg

(57) ABSTRACT

A device for securing to a surface of a container for restraining cargo within the container. The device comprises a receptacle and a pair of lateral flaps disposed about the receptacle for engaging the surface. The receptacle includes a base and defines a cavity for receiving an end of the elongated support member. Each lateral flap has a rear side for engaging the surface and a front side. Desirably, the receptacle includes a pair of opposed first walls defining the cavity and extending generally perpendicular to the opposed first walls, and the lateral flaps are associated with the opposed first walls. The receptacle may include a ramp wedge adjacent the channel for facilitating engagement of the elongated support member with the device. The device is secured to the surface of the container by the elongated support member and, if desired, an adhesive tape or other fastener may be associated with the rear side for engaging the lateral flaps and surface of the container.

13 Claims, 7 Drawing Sheets

CARGO RESTRAINT DEVICE

This application is a continuation-in-part application of U.S. design patent application Ser. No. 29/141,186 filed on May 1, 2001, entitled "Cargo Restraint Device and now abandoned."

BACKGROUND

The present invention relates generally to a device for restraining cargo within a container, and, more particularly, to a device for receiving an elongated support member to limit the shifting of cargo in a semi-trailer or other cargo-shipping vehicle.

Cargo transported for commercial and other uses is often shipped in semi-trailers or other trucks, ships, aircraft or other shipping vehicles. Typically, these vehicles act as or include containers which are generally cube-like in design or which otherwise include a pair of opposed walls. The cargo being shipped is rarely an exact fit within the container, and, even when the cargo is placed in boxes, the boxes may not fit perfectly into the container. Loading of shipping vehicles is even more complicated by the fact that not all shipping vehicles are uniform in size. At other times, the shipping vehicle or container may be only partially filled, thus leaving a void in the trailer. In most instances, shifting or translation of cargo within the shipping vehicle or container can occur during shipping. Such shifting or translation of cargo is undesirable because, among other reasons, it can lead to damage, especially when the items being shipped are fragile or perishable.

U.S. Pat. No. 5,494,389, which is incorporated herein in its entirety by reference, discloses a cargo retention device that has been very well received in the shipping industry. The device includes a receptacle that can be secured to a wall of a cargo container and that engages one end of an elongated support member, such as a wooden 4"×4", 2"×4" or the like. A pair of the devices may be secured to opposed walls of the cargo container such that the support member extends therebetween for restraining cargo within the container.

It is an object of the present invention to provide a cargo restraint device that is stronger and sturdier than the invention of the '389 patent but that still provides advantages and benefits of the invention of the '389 patent.

It is a further object of the present invention to provide such a cargo restraint device that hinders or counters a rolling effect that may be caused by the support member.

It is a further object to provide such a cargo restraint device that is cost effective to manufacture and use.

SUMMARY

In accordance with these and other objects, the present invention in accordance with a preferred embodiment provides a device for securing to a wall or other surface of a container to engage an elongated support member to restrain cargo within the container. The container may be in the form of a semi-trailer truck or any other shipping vehicle or portion thereof.

The device comprises a receptacle and, desirably, a pair of lateral flaps associated with and disposed about the receptacle for engaging the surface of the container. The receptacle defines a cavity for receiving an end of the support member. Desirably, the receptacle includes a pair of opposed first walls defining the cavity for engaging the support member, and each lateral flap is associated with and extends generally perpendicular to a respective first wall. The receptacle may include a ramp wedge adjacent the cavity for facilitating receipt of the end of the support member into the cavity and engagement of the support member. The device is secured to the surface of the container by the support member, and desirably, also by an adhesive tape or other fastener associated with rear sides of the lateral flaps.

The device may also include gussets interconnecting the receptacle and the lateral flaps. In a preferred embodiment, a plurality of gussets interconnect the lateral flaps with respective first walls. The pair of lateral flaps may be interconnected by, for example, a third lateral flap that desirably is integral with the pair of flaps. The receptacle may also include an interconnecting wall interconnecting the opposed first walls, with the third lateral flap being associated with the interconnecting wall. The device may also include one or more additional gussets interconnecting the interconnecting wall and a front side of the third lateral flap.

The receptacle may also include a pair of second opposed walls disposed between the first walls and extending generally parallel to the first walls and defining a channel therebetween. The receptacle desirably also includes a pair of engaging surfaces for engaging an end of the support member disposed between the pair of first opposed walls. The engaging surfaces desirably extend generally perpendicular to the first and second walls and each engaging surface interconnects a respective first wall with a top of a respective second wall such that the first walls extend from the lateral flaps beyond the second walls. At least one reinforcing rib may extend across the channel interconnecting the walls.

The device in accordance with a preferred embodiment of the present invention provides significant benefits in addition to the benefits provided by the invention of the '389 patent. For example, because they extend laterally from the receptacle, the lateral flaps prevent the device from rolling over in response to a rolling effect that may be imposed by the support member. The lateral flaps also provide additional surface area for securing the cargo restraint device to the surface. Additionally, the gussets add strength and rigidity to the receptacle and also transfer to the lateral flaps significant shearing forces imposed by the support member. The ribs included in the receptacle also add strength thereto in a cost effective manner.

BRIEF DESCRIPTION OF DRAWINGS

The present invention and the advantages thereof will become more apparent upon consideration of the following detailed description when taken in conjunction with the accompanying drawings.

DETAILED DESCRIPTION OF THE DRAWINGS

Figure 1:
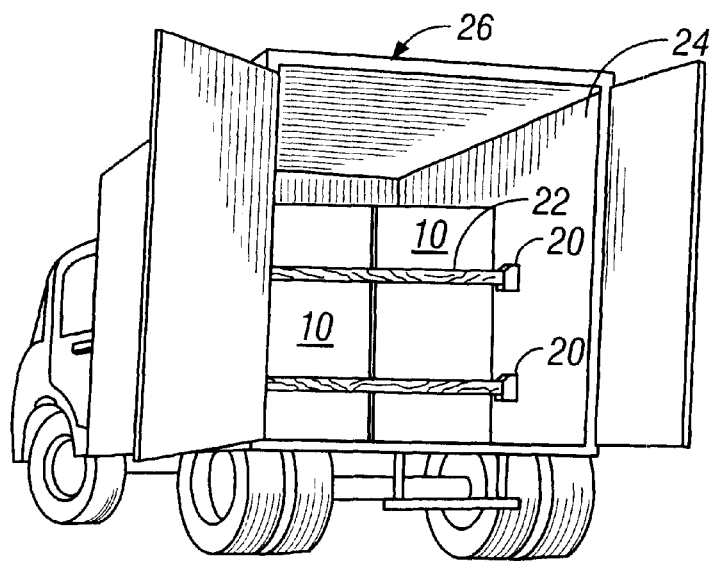
FIG. 1 illustrates an example of cargo being restrained on a truck by support members and cargo restraint devices in accordance with an embodiment of the invention.
Figure 2:
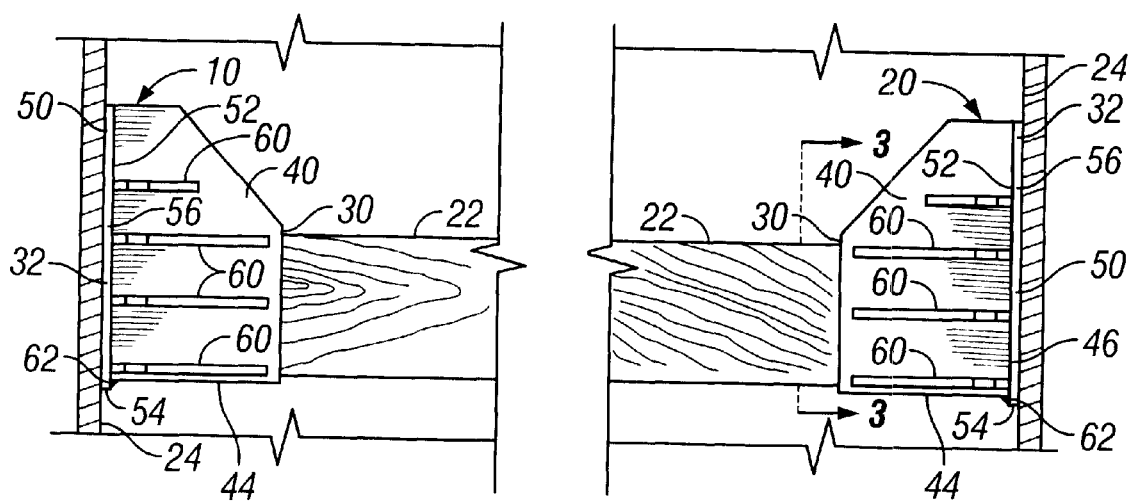
FIG. 2 is a broken view of FIG. 1 illustrating one of the support members engaged with two cargo restraint devices secured to the opposed walls of the trailer of the truck.
Figure 3:
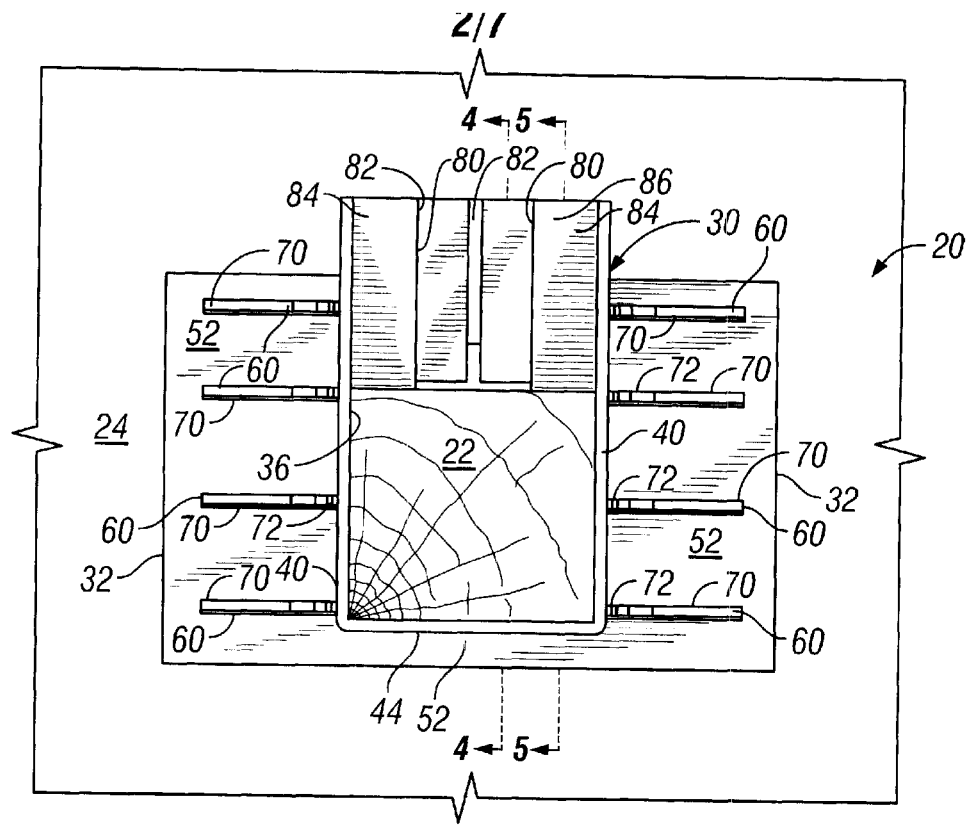
FIG. 3 is a cross section view taken along lines 3—3 of FIG. 2.
Figure 4:
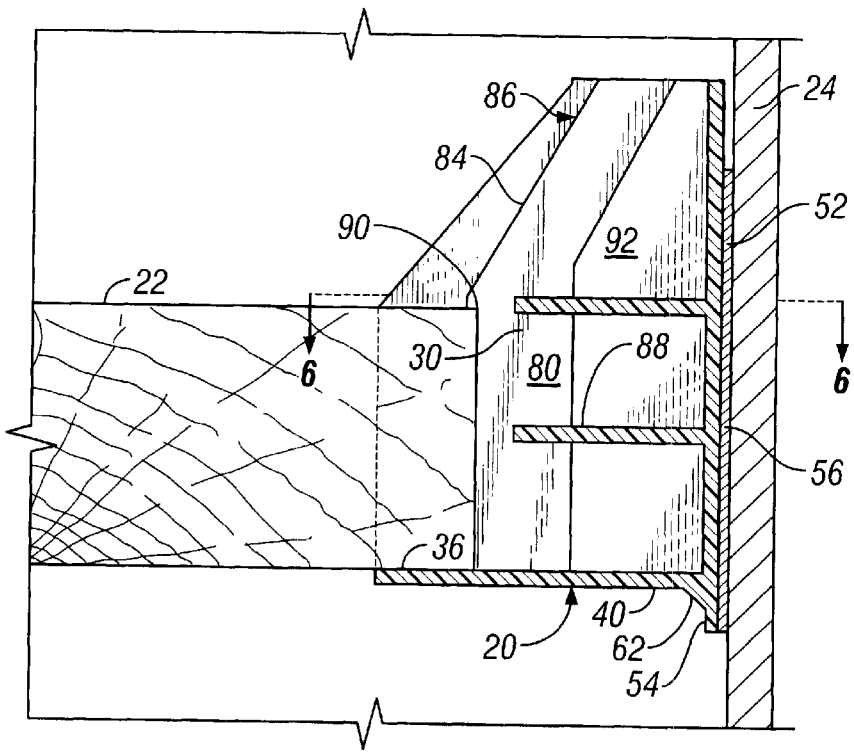
FIG. 4 is a cross section view taken along the lines 4—4 of FIG. 3.
Figure 5:
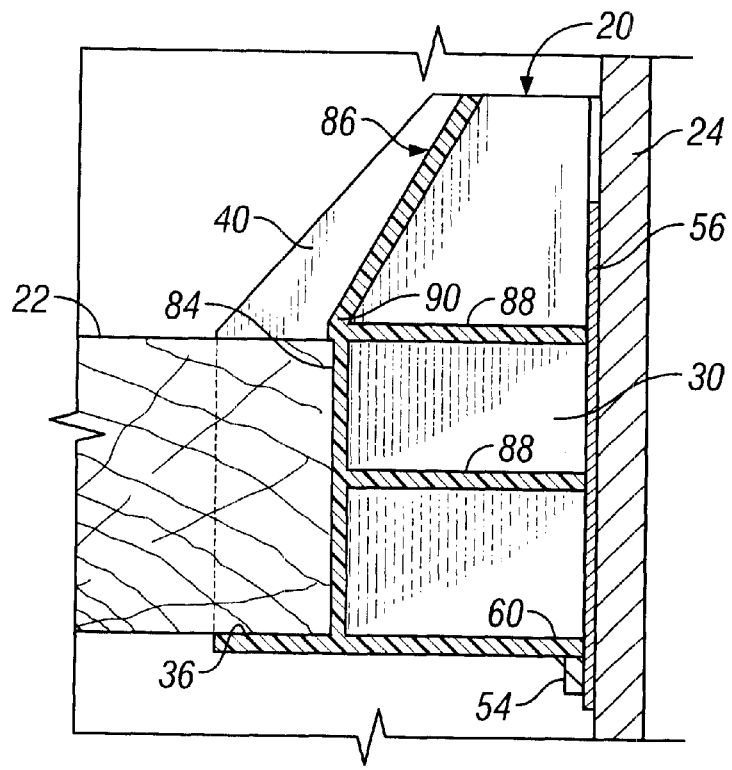
FIG. 5 is a cross section view taken along the lines 5—5 of FIG. 3.
Figure 6:
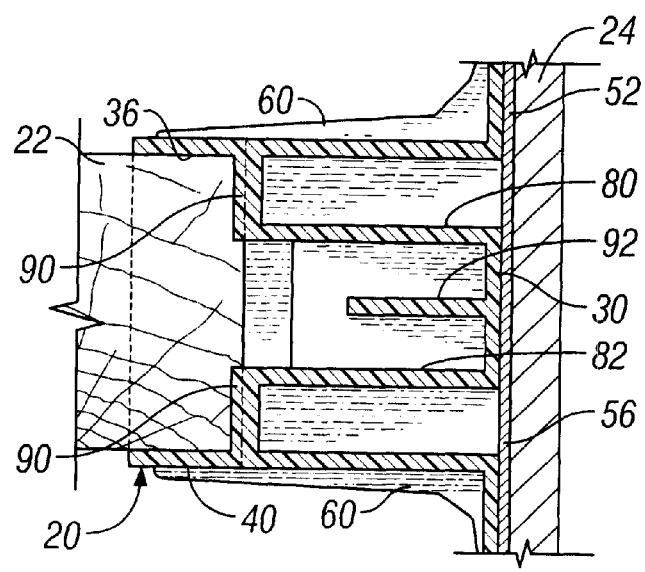
FIG. 6 is a cross section view taken along the lines 6—6 of FIG. 4.
Figure 7:
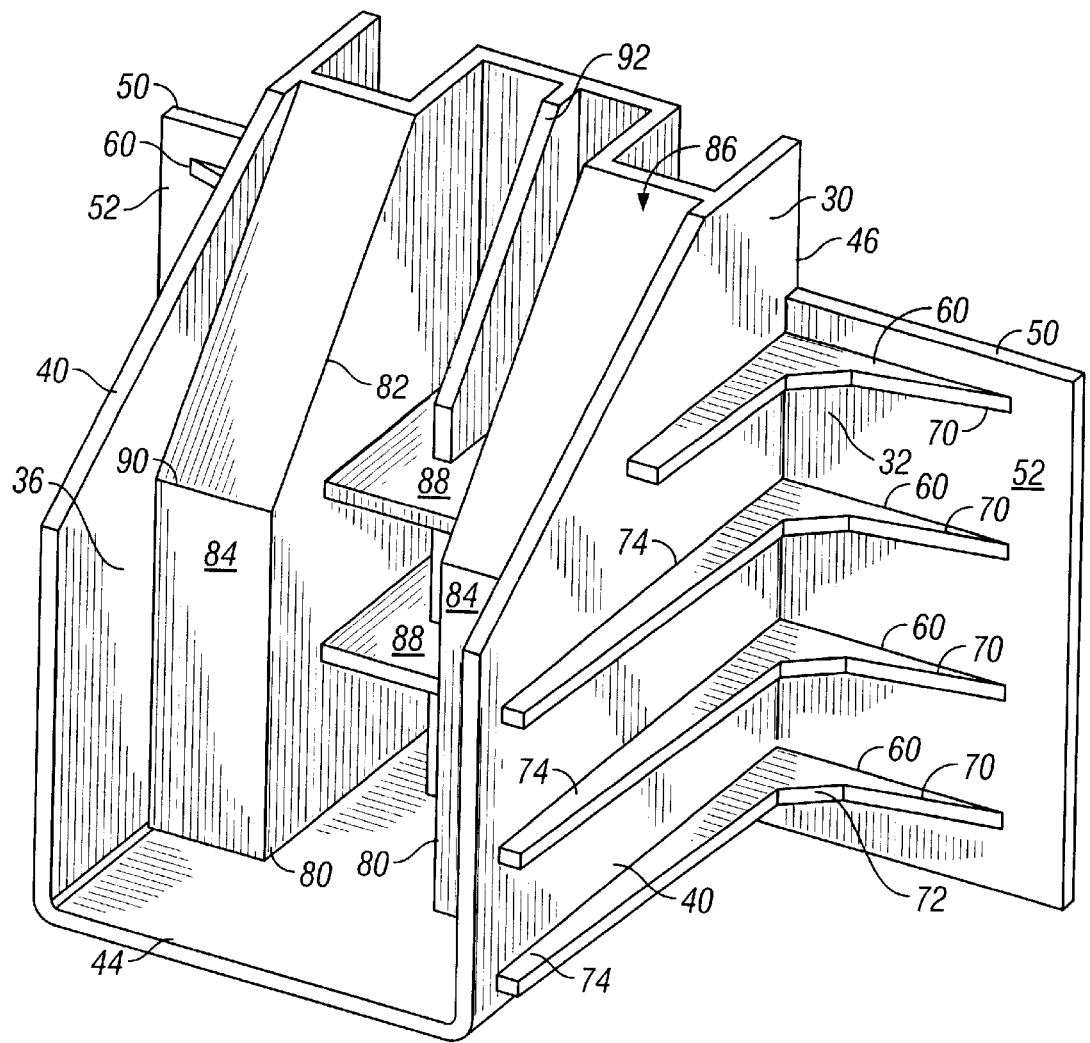
FIG. 7 is a perspective view of one of the cargo restraint devices of FIG. 2.
Figure 8:
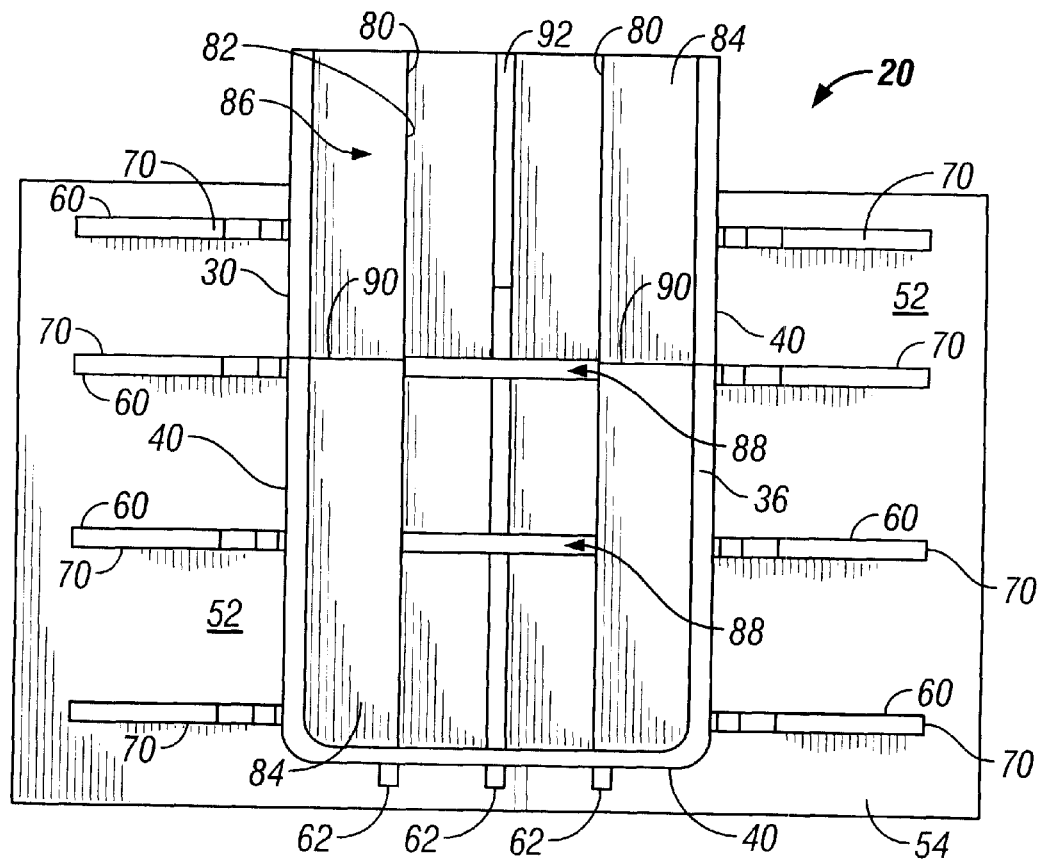
FIG. 8 is a front plan view of the cargo restraint device of FIG. 7.
Figure 9:
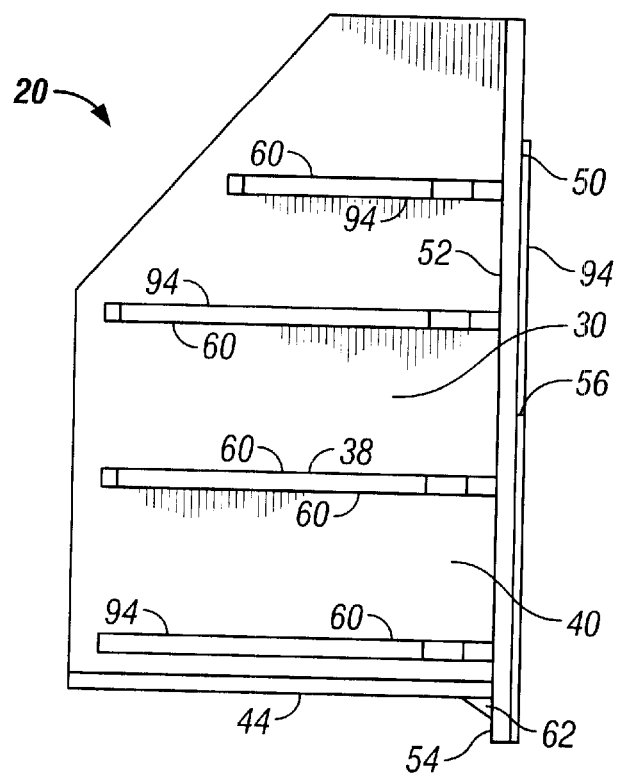
FIG. 9 is a side plan view of the cargo restraint device of FIG. 7.
Figure 10:
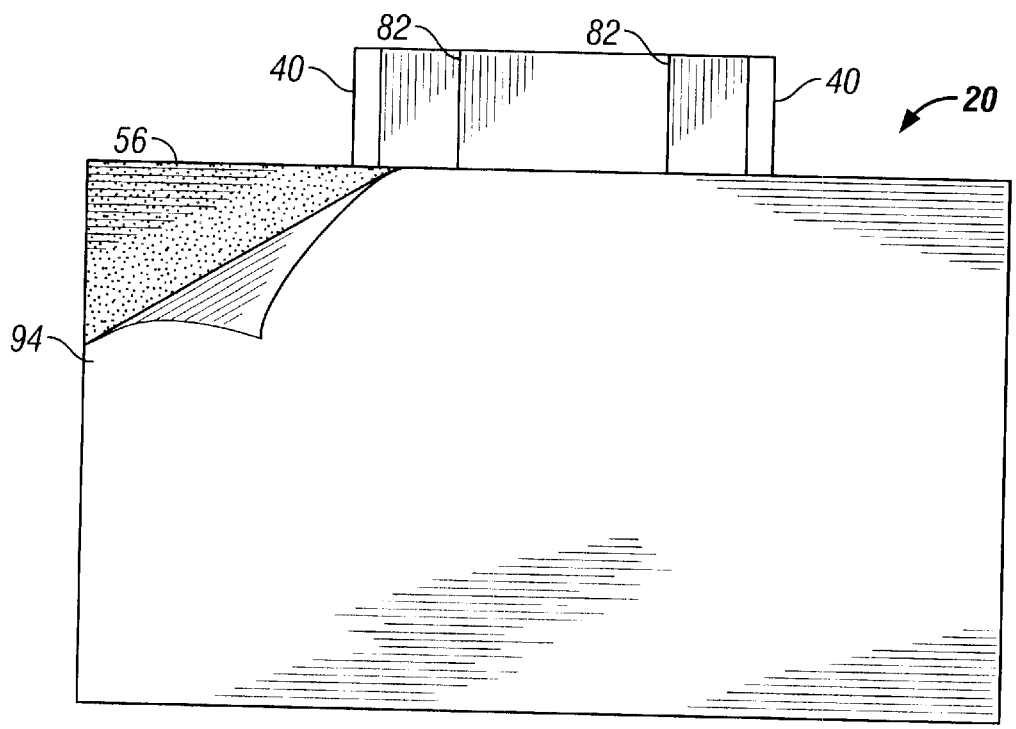
FIG. 10 is a rear plan view of the cargo restraint device of FIG. 7; the illustrating two-sided adhesive tape secured to the rear surface of the cargo restraint device.
Figure 11:
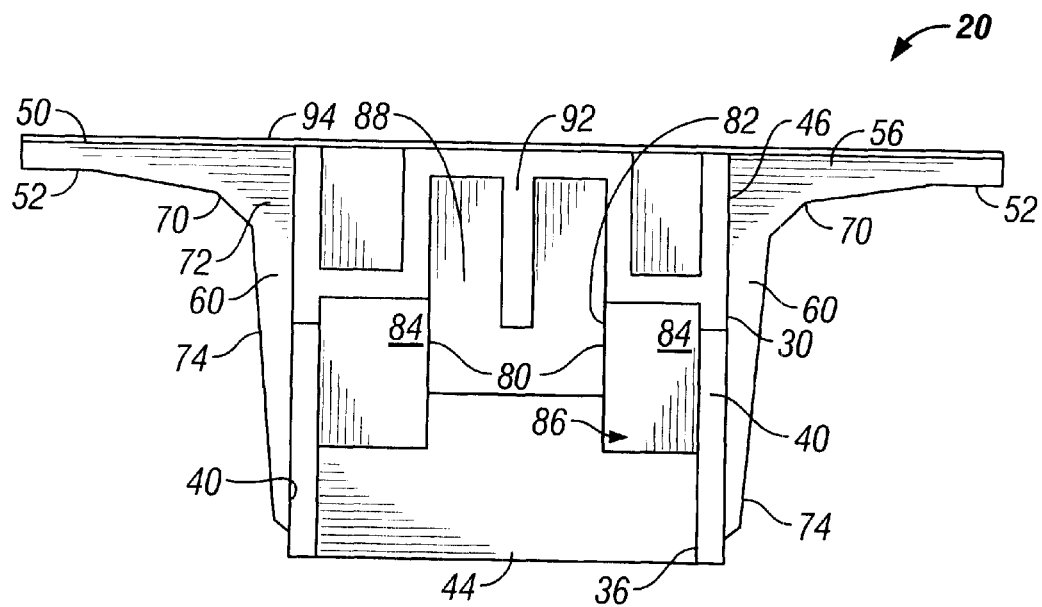
FIG. 11 is a top plan view of the cargo restraint device of FIG. 7.
Figure 12:
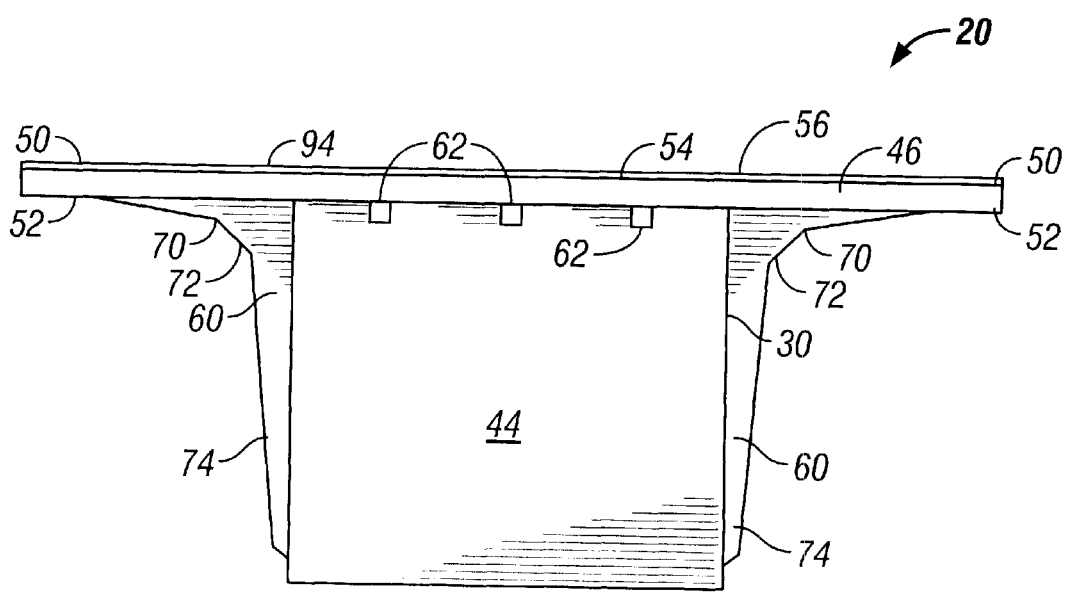
FIG. 12 is a bottom plan view of the cargo restraint device of FIG. 7.

FIGS. 1 and 2 provide an example of cargo 10 being restrained by cargo restraint devices 20 in accordance with a preferred embodiment and by a pair of elongated support members 22 engaged therewith. In FIGS. 1 and 2, pairs of the cargo restraint devices 20 are secured to opposed walls 24 of a container in the form of a trailer of a truck 26 and each pair of cargo restraint devices is engaged with a corresponding one of the support members 22 extending across the bed of the truck. The cargo restraint devices 20 in accordance with the present invention can be used for limiting the shifting of cargo being transported by or within the truck 26 of FIG. 1, or by or within any other shipping vehicle, such as, for example, any other type of truck, ship or aircraft. The restraint cargo device 20 desirably is readily attachable to the wall 24 or other surface of the shipping vehicle and easily engageable with a corresponding end of the support member 22. Although the support member 22 may have any suitable construction, the cargo restraint device 20 in accordance with a preferred embodiment preferably is used to engage a wooden 4"×4".

FIGS. 3–12 illustrate the cargo restraint device 20 in accordance with a preferred embodiment. The illustrated cargo restraint device 20 includes a receptacle 30 and a pair of opposed lateral flaps 32 associated with and disposed about the receptacle. The receptacle 30 defines a cavity 36 for receiving a respective end of the support member 22. The receptacle 30 includes a pair of opposed first walls 40 extending upright from the lateral flaps 32 and an interconnecting wall 44 interconnecting the first walls. In the illustrated embodiment, the lateral flaps 32 and first walls 40 are integral or otherwise unitary with each other at the bases 46 of the first walls. Each lateral flap 32 includes a rear side 50 for securing to the surface and a front side 52.

The pair of lateral flaps 32 can have any suitable construction. In the illustrated embodiments, the pair of lateral flaps 32 are joined together by a third lateral flap 54 associated with and extending outward from the interconnecting wall 44. With this embodiment, the pair of lateral flaps 32 and the third lateral flap 54 together comprise a single integral or otherwise unitary construction, and the third lateral flap 54 has substantially less expanse than the lateral flaps 32. In a preferred embodiment, a two-sided tape 56 is affixed to the rear side of the lateral flaps 32 and 54 across the back of the cargo restraint device 20 to facilitate securement to the wall 24 or other surface of the container.

The illustrated cargo restraint device 20 also includes a plurality of gussets 60 interconnecting the first walls 40 with the front sides 52 of the lateral flaps 32, and, if desired, a another plurality of gussets 62 interconnecting the interconnecting wall 44 with the third lateral flap 54. The gussets 60 and 62 add strength and rigidity to the receptacle 30 and tend to transfer to the flaps 32 and 54 or counter force applied to the receptacle. For example, the gussets 60 transfer or counter shearing force applied by the support member 22 to the first wall 40 by transferring shearing force to the lateral flaps 32 and thus the wall 24 or other surface of the container, and also strengthen the lateral flaps and the first walls. Similarly, the gussets 62 tend to transfer shearing force imposed on interconnecting wall 44 to the lateral flap 54, and also strengthen the lateral flap 54 and the interconnecting wall.

The gussets 60 and 62 may have any suitable construction. In a preferred embodiment, for example, each of the gussets 60 include three portions, namely a flap portion 70, an interconnecting portion 72 and a first wall portion 74. The flap portion 70 extends most of the width of the lateral flap 32 and gradually decreases in height as it extends outward from the first wall 40. The interconnecting portion 72 is generally triangular. The first wall portion 74 extends most of the length of the first wall 40 in height, and decreases in width as it extends from the lateral flap 32. The third gussets 62 are illustrated as being triangular in shape.

The receptacle 30 of the illustrated cargo restrain device 20 also includes a pair of opposed second walls 80 disposed between the pair of first walls 40 defining a channel 82 therebetween. The pair of second walls 80 extend from their base to a lesser height than the first walls 40. The receptacle also includes a pair of engaging surfaces 84 which join the first walls 40 with the tops of the second walls 80 for engaging the respective end of the support member 22 when it is within the receptacle 30 and which define a base of the cavity 36. The second walls 80 and the engaging surface 84 also are configured to define a ramp wedge 86 that extends adjacent the cavity 36 to facilitate receipt of the end of the support member into the cavity and engagement between the receptacle 30 and the support member. In addition, the receptacle 30 includes a pair of ribs 88 interconnecting the pair of second walls 80 to add strength and rigidity.

The engaging surfaces 84 include lips 90 for maintaining the support member within the cavity 36. The height of the first wall 40 relative to the lateral flaps 32 is illustrated as being constant between the interconnecting wall 44 and the lips 90, and then decreases along the length of the ramp wedge 86. The second walls 82 are similarly configured except they extend to a lesser height than the first walls 40. Additionally, a longitudinal strengthening rib 92 of lesser height is disposed between the second walls 80 and is also configured similarly to the first and second walls and 40 and 80.

As illustrated in FIGS. 1 and 2, desirably, a pair of the cargo restraint devices 20 in accordance with a preferred embodiment may be secured to opposed walls 24 or other surfaces of the container and engage opposed ends of the support member 22. Each cargo restraint device 20 may be secured to the respective wall 24 or other surface of the container in any suitable manner desirably with the ramp wedge 86 facing upward. In a preferred embodiment, for example, the cargo restraint device 20 includes a removable release layer 94 associated with the two-sided tape 56. After removal of the release layer 94, the cargo restraint device 20 can be pressed against the surface to secure it to the surface.

In a preferred application, another cargo restraint device 20 is then secured to the opposed surface of the container. The support member 22 may then be positioned relative to the cargo restraint devices 20 and raised slightly above the receptacles 30. The support member 22 is then placed adjacent one or both of the ramp wedges 86 of the cargo restraint devices 20. The support member 22 is then lowered until it contacts one or both ramp wedges 86. After support member 22 contacts the ramp wedge 86, further pressure is applied to cause the support member to cam or wedge into the cavities 36. Desirably, once support member 22 is wedged into place, the support member 22 is in compression and thus exerts a tensile or axial force on the cargo restraint devices 20 and thus the surfaces of the container, causing the surfaces to exhibit resilient properties. The result is that the cargo restraint devices 20 are locked firmly in place.

The cargo restraint device 20 can have any suitable dimensions and configuration. For example, in a accordance with one embodiment of the invention, the cargo restraint device 20 is sized and configured such that a pair of the cargo restraint devices engages snuggly a standard wooden 4"×4" across the bed of a truck. In this regard, the cavity 36 defined by each cargo restraint device 20 is sized to snugly receive the end of a wooden 4"×4". Additionally, because the inner dimension of a conventional trailer truck typically is 101" and standard wooden 4"×4"'s typically extend 96" in length, desirably, the engaging surfaces 84 are located about or slightly less than about 2.5" from the respective inner walls of the truck when the pair of cargo restraint devices are secured to the walls 24.

The lateral flaps 32 and 54 provide significant benefits. The lateral flaps 32, for example, reduce, if not eliminate, the possibility that the cargo restraint device 20 will roll over as a result of the a shearing stress applied by the support member 22 in either lateral direction. The lateral flap 54 similarly reduces, if not eliminates, the possibility that the cargo restraint device 20 will roll back in response to a shearing stress applied by the support member 22 in a back direction. Further, the lateral flaps 32 and 54 provide additional surface area for the two-sided tape 56 and this additional surface area for engaging the wall 24 or other surface of the container. The gussets 60 and 62 add strength and rigidity to the receptacle 30 and also transfer to the lateral flaps 32 and 54 shearing force caused by the support member 22. The ribs 88 included in the receptacle also add strength thereto in a cost effective manner.

The foregoing description is for purposes of illustration only and is not intended to limit the scope of protection accorded this invention. The scope of protection is to be measured by the following claims, which should be interpreted as broadly as the inventive contribution permits.

What is claimed is:

1. A device for securing to a surface of a container for engaging an elongated support member to restrain cargo within the container, the device comprising:
   (a) a receptacle defining a cavity for receiving an end of the elongated support member; and
   (b) a pair of lateral flaps associated with and disposed about the receptacle for engaging the surface;
   wherein the receptacle includes:
   (i) a pair of opposed first walls defining the cavity for engaging the elongated support member, a base of each of the first walls being integral with a respective lateral flap;
   (ii) a pair of opposed second walls disposed between the pair of first walls, the pair of second walls extending generally parallel to the first walls, the pair of second walls defining a channel therebetween; and
   (iii) a pair of engaging surfaces also defining the cavity for engaging the end of the elongated support member, the engaging surfaces being disposed between the first walls and extending generally perpendicular to the first and second walls, each engaging surface interconnecting one of the first walls with a top of a respective second wall such that the first walls extend beyond the second walls.

2. The device of claim 1 wherein the receptacle further includes at least one reinforcing rib extending across the channel and interconnecting the second walls.

3. The device of claim 1 further including a plurality of gussets and wherein each first wall is interconnected with a front side of the respective lateral flap by at least one of the gussets.

4. The device of claim 1 wherein the receptacle further includes a ramp wedge adjacent the engaging surfaces for facilitating receipt of the end of the elongated support member by the cavity and engagement of the elongated support member by the first walls and the engaging surfaces.

5. The device of claim 1 further comprising a fastener associated with rear sides of the lateral flaps for securing the lateral flaps to the surface of the container.

6. The device of claim 5 wherein the fastener comprises an adhesive tape.

7. A device for securing to a surface of a container for engaging an elongated support member to restrain cargo within the container, the device comprising:
   (a) a receptacle member including:
   (i) a pair of opposed first walls defining a cavity for receiving an end of the elongated support member;
   (ii) a pair of opposed second walls disposed between the first walls and extending generally parallel to the first opposed walls, the second opposed walls defining a channel therebetween;
   (iii) a pair of engaging surfaces also defining the cavity for engaging the end of the elongated support member, the engaging surfaces disposed between the first opposed walls and extending generally perpendicular to the first and second walls, each engaging surface interconnecting a respective first wall with an end of a respective second wall such the first walls extend beyond the second walls; and
   (iv) at least one reinforcing rib extending across the channel and interconnecting the second walls; and
   (b) a pair of lateral flaps disposed about the receptacle and associated with the first walls and extending generally perpendicular to the first walls, the lateral flaps for engaging the surface of the container.

8. The device of claim 7 further including a plurality of first gussets interconnecting one of the first walls and a front side of one of the lateral flaps and a plurality of second gussets interconnecting the other first wall and a front side of the other lateral flap.

9. The device of claim 8 further including a third lateral flap interconnecting the pair of lateral flaps.

10. The device of claim 9 further including a plurality of third gussets and wherein the receptacle further includes an interconnecting wall interconnecting the first walls, the third lateral flap being associated with the interconnecting wall, and the plurality of third gussets interconnecting the interconnecting wall and a front side of the third lateral flap.

11. A device for securing to a surface of a container for engaging an elongated support member to restrain cargo within the container, the device comprising:
   (a) a receptacle member including
   (i) a pair of opposed first walls defining a cavity for receiving an end of the elongated support member, each wall having a base;
   (ii) a pair of opposed second walls disposed between the first walls and extending generally parallel to the first walls, the second walls defining a channel therebetween; and
   (iii) a pair of engaging surfaces also defining the cavity for engaging the elongated support member, the engaging surfaces disposed between the pair of first walls and extending generally perpendicular to the first and second opposed walls, each engaging surface interconnecting a respective first wall with an end of a respective second wall such that the first walls extend beyond the second wall;

(b) a pair of lateral flaps disposed about the receptacle and associated with the bases of the first walls for engaging the surface of the container, the lateral flaps extending generally perpendicular to the first walls; and (c) a plurality of first gussets interconnecting a front side of one of said lateral flaps and one of the first walls, and a plurality of second gussets interconnecting a front side of the other lateral flap and the other first wall.

12. The device of claim 11 further including a third lateral flap and a plurality of third gussets and wherein the receptacle includes an interconnecting wall interconnecting the first walls, the third lateral flap associated with the interconnecting wall, and the plurality of third gussets interconnecting the interconnecting wall and a front side of the third lateral flap.

13. The device of claim 12 wherein the pair of lateral flaps are interconnected by the third lateral flap.

* * * * *